United States Patent [19]

Adams et al.

[11] Patent Number: 4,464,520
[45] Date of Patent: Aug. 7, 1984

[54] DELAYED CURE BISMALEIMIDE RESINS

[75] Inventors: Johnnie E. Adams, Grandview, Mo.; Donald R. Jamieson, Merriam, Kans.

[73] Assignee: The United States of America as represented by the United States Department of Energy, Washington, D.C.

[21] Appl. No.: 407,664

[22] Filed: Aug. 12, 1982

[51] Int. Cl.$^3$ .......................................... C08F 122/40
[52] U.S. Cl. ................................. 526/262; 524/548; 526/242; 526/243; 526/247; 526/249
[58] Field of Search ............... 526/242, 243, 247, 249, 526/262; 524/548

[56] References Cited

U.S. PATENT DOCUMENTS

| | | | |
|---|---|---|---|
| 2,818,405 | 12/1957 | Kovacie | 260/78 |
| 3,380,964 | 4/1968 | Grundschober et al. | 260/47 |
| 3,435,003 | 3/1969 | Graven | 526/262 |
| 3,533,996 | 10/1970 | Grundschober et al. | 260/47 |
| 3,562,223 | 2/1971 | Bargain et al. | 260/78 |
| 3,627,780 | 12/1971 | Bonnard et al. | 526/262 |
| 4,100,140 | 7/1978 | Zahir et al. | 428/473.5 |
| 4,116,937 | 9/1978 | Jones et al. | 528/170 |
| 4,118,377 | 10/1978 | D'Alelio | 526/262 |
| 4,269,961 | 5/1981 | Jones et al. | 526/262 |

OTHER PUBLICATIONS

Bell, J., Pol. Sc., Polymer Chem. Ed. 14, 2275–2292, (1976).
Kwiatkowski et al., J. Pol. Sc., Polymer Chem. Ed. 13, 961–972, (1975).
Stenzenberger, J. Applied Polymer Sc. Applied Pol. Symposium 31, 91–104, (1977).
Stenzenberger, NASA, Conference on Polymeric Mat'ls, NASA–Ames Research Center, Nov. 29–30–Dec. 1, 1972.

Primary Examiner—Harry Wong, Jr.
Attorney, Agent, or Firm—Armand McMillan; Albert Sopp; Michael F. Esposito

[57] ABSTRACT

Polybismaleimides prepared by delayed curing of bisimides having the formula

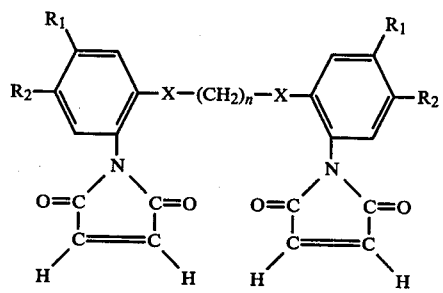

wherein
$R_1$ and $R_2$ each independently is H, $C_{1-4}$-alkyl, $C_{1-4}$-alkoxy, Cl or Br, or
$R_1$ and $R_2$ together form a fused 6-membered hydrocarbon aromatic ring, with the proviso that $R_1$ and $R_2$ are not t-butyl or t-butoxy;
X is O, S or Se;
n is 1–3; and
the $—(CH_2)_n—$ group, optionally, is substituted by 1–3 methyl groups or by fluorine.

4 Claims, No Drawings

DELAYED CURE BISMALEIMIDE RESINS

The U.S. Government has rights in this invention pursuant to Contract No. DE-AC04-76DP00613 between the U.S. Department of Energy and Bendix Corporation.

BACKGROUND OF THE INVENTION

Aromatic polyimides are widely used thermosetting polymers having properties especially suitable for high temperature, high performance applications such as those encountered in spacecraft and missile uses. They are employed as binders for composite molded components requiring high thermaloxidative resistance and as surface protection coatings.

Recently, various structural modifications in the aromatic polyimides have been attempted. These all have as their aim an optimization of and/or balance between the desired end use properties such as thermaloxidative stability, mechanical strength, etc. and ease of processing.

Much attention has been focused on aromatic polyimides having the following base structure:

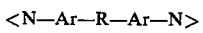

Ar is generally a phenyl ring or a substituted phenyl ring. The R-bridging group can be chosen from a wide diversity of possibilities. Typical structural modifications attempted in the past include changes in the structure of Ar, R, as well as the two groups attached to the terminal N atoms.

In addition, some attention has been given to the orientation of attachment of the R group to the two aryl groups. For example, Bell et al, Journal of Polymer Science: Polymer Chemistry Edition, Volume 14, 2275-2292 (1976), discloses the variation in polymerizability and polymer properties with differing orientations, i.e., p, p'; m, m'; o, o'; p, m'; p, o'; etc. Of particular note was the finding that imide monomers having at least one o-orientation were significantly more difficult to polymerize due to inductive and steric effects. Such results were shown in two series of polyimides, i.e., those based upon the diaminodiphenylmethanes and the diaminobenzophenones.

One subclass of polyimides having the structure depicted above is the polybismaleimide system. The base structure of the monomer is:

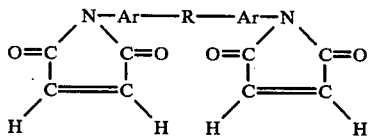

or, alternatively, such compounds wherein the bridging group is a single substituted or unsubstituted aromatic ring instead of —Ar—R—Ar—.

Polybismaleimide systems having the depicted structure are disclosed, e.g., in Stenzenberger, Journal of Applied Polymer Science: Applied Polymer Symposium, Vol. 31, 91-104 (1977) or Stenzenberger, "The Preparation and Properties of High Performance Polyimide Composites", NASA Conference of Polymeric Materials for Unusual Service Conditions, NASA-Ames Research Center, Nov. 29-30-Dec. 1, 1972 (4,4'-bismaleimidodiphenylmethanes; 4,4'-bismaleimidodiphenylethers); U.S. Pat. No. 4,116,937 to Jones et al (R=—S—, —CH$_2$—, —C$_2$H$_4$—, inter alia; Ar=phenyl); and U.S. Pat. No. 4,100,140 to Zahir et al (R=—S—, —CH$_2$—, —C(CH$_3$)$_2$—, inter alia; Ar=phenyl). None of these disclose o,o'-compounds, ostensibly in view of the prejudice mentioned by Bell et al, supra, that such compounds are most difficult to polymerize to high molecular weights and/or have insufficiently high properties.

All of the prior art polybismaleimides have a common significant disadvantage, i.e., they all begin to polymerize at a temperature which is at or just above the melting point of the monomer. As a result, it is not possible to obtain a homogeneous melt prior to polymerization. The problem is especially severe in fabrication of large compression molded articles on the order of several or more inches thick. When a mold containing the bismaleimide is heated to the melting temperature, the outer portions of the mold reach the set temperature before the center of the mold; therefore, the outer portion of the matrix cures before the inner portion begins to melt. Cracks, voids and other defects easily develop under these conditions when final mold pressures are applied.

State of the art methods of overcoming these difficulties are unsatisfactory. For example, Grundschober et al (U.S. Pat. No. 3,533,966) require the addition of an extra ingredient into the mold in order to increase the pot-life of the monomer, i.e., the time period in which the (heretofore polymerizing) monomer can be poured. Kwiatkowsky et al (Journal of Polymer Science: Polymer Chemistry Edition, Volume 13, 961-972 (1975)) have attempted to improve flow properties by incorporating a polysulfone structure in the bridge between the maleimido groups. Both of these solutions are inadequate for many applications.

Another problem complicating the design of new polybismaleimides composites is the carcinogenic nature of many aromatic diamines including the bismaleimides. This limits the variety of commercially feasible alternatives.

SUMMARY OF THE INVENTION

Accordingly, it is an object of this invention to provide new bismaleimide resins which overcome the foregoing difficulties, e.g., which have an increased pot-life, i.e., which provide longer time periods than currently available in which the monomer remains fluid.

It is another object of this invention to provide such bismaleimide resins which can be polymerized into polymers, e.g., in the form of molded articles, having high uniformity of properties.

It is a further object of this invention to provide a method for increasing the period of time in which a bismaleimide monomer is fluid prior to onset of polymerization and/or achievement of the polymerization point at which the resultant polymer becomes set.

Upon further study of the specification and appended claims, further objects and advantages of this invention will become apparent to those skilled in the art.

These objects have been achieved by providing bismaleimides of formula (I)

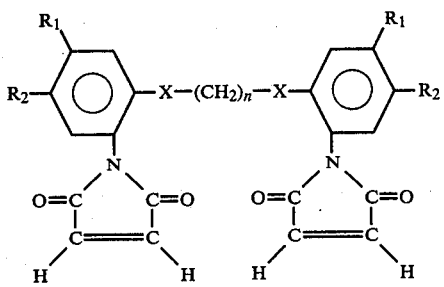

wherein

R$_1$ and R$_2$ each independently is H, C$_{1-4}$-alkyl, C$_{1-4}$-alkoxy, Cl or Br, or R$_1$ and R$_2$ together form a fused 6-membered hydrocarbon aromatic ring, with the proviso that R$_1$ and R$_2$ are not t-butyl or t-butoxy;

X is O, S or Se;

n is 1–3; and the alkylene bridging group is optionally substituted by 1–3 methyl groups or by fluoro, e.g., perfluorinated.

These objects have also been achieved by providing the polybismaleimides prepared by polymerizing these bismaleimides. The invention also relates to composite components containing the polybismaleimides as a binder in conjunction with a conventional filler.

A particular feature of this invention is the fact that the bismaleimides of this invention can be raised to a temperature greater than their melting point but less than the temperature at which they begin to polymerize. In other words, the melting and polymerization initiation points are sufficiently separated that the bismaleimides do not begin to polymerize upon melting. As a result, they can be held in the fluid state at a temperature less than their polymerization point. This enables the formation of a melt which is homogeneous, especially from a thermal profile point of view. After homogeneity has been attained, the temperature of the bismaleimides can be increased to a temperature at which they polymerize.

DETAILED DISCUSSION

In formula (I), when R$_1$ and/or R$_2$ is alkyl or alkoxy, suitable groups include methyl, ethyl, propyl, isopropyl, n-butyl, iso-butyl, etc. and the corresponding alkoxy groups, but not tert-butyl or tert-butoxy. R$_1$ and R$_2$, preferably, are both H. Preferred alkyl and alkoxy groups for R$_1$ and R$_2$ are those having on or two carbon atoms.

Also preferred are those compounds wherein one of R$_1$ and R$_2$ is H and the other is Cl or Br, as well as those compounds wherein both of R$_1$ and R$_2$ are Cl and/or Br. These halo-containing compounds are preferred, inter alia, because of the resultant smoke and fire retardancy which is imparted to the corresponding resins.

The R$_1$ and R$_2$ groups together can form a fused 6-membered aromatic ring, i.e., the maleimido and X groups can be attached to a naphthyl ring instead of a phenyl ring.

Preferably, X is S or Se, most preferably S. n most preferably is 2. In all cases, it is preferred that the alkylene bridging group be unsubstituted, but it is possible that substituents can be attached, e.g., 1–3 methyl groups. Generally, at most one methyl group is attached to each methylene group. Fluoro substitution is also possible; such as perfluorination, i.e., a —(CF$_2$)$_n$-bridging group. Equivalent substituents are also contemplated within the scope of this invention.

The most preferred compound of this invention is 1,2-bis(2-maleimidophenylthio)ethane.

All of the bismaleimides of formula (I) can be prepared using fully conventional methods. The classic imidization reaction can be employed. For example, maleic anhydride can be reacted with the diamine corresponding to the final product bismaleimide desired. Typically, the imidization is carried out in an inert aprotic solvent such as dimethylformamide, dimethylsulfoxide, acetamide, etc.; using about stoichometric amounts of reactants, i.e., a slight excess of maleic anhydride is preferred. Typical reaction temperatures are 40°–60° C., preferably 50°–60° C., usually about 55° C. at temperatures above 65° C. significant hydrolysis occurs, producing undesired side reactions. Typical reaction times are 1–1.5 hours.

Although the imidization chemistry is per se conventional, it was not expected that the o,o'-bismaleimides of this invention could be successfully prepared by reacting the corresponding diamines and maleic anhydride because of the steric and inductive effects involved. Thus, the successful imidization reaction of this invention was most surprising. A significant advantage of this invention is the fact that all components of the reaction, especially the diamines are unlikely to be carcinogenic.

The aromatic diamines are all either commercially available or readily preparable using fully conventional methods of fundamental synthetic organic chemistry as described in basic texts such as Organic Chemistry, by Morrison and Boyd 3rd ed., 1973, Allyn and Bacon, Inc., Boston, or Organic Chemistry by Friser and Frish, 3rd ed., 1956, Reinhold Pub. Corp., N.Y. Generally, these diamines are prepared by conventional reactions between the appropriately substituted anilines and the corresponding glycol, dithioalkane and diselenoalkane.

One of the key features of the bismaleimides of this invention is derived from the fact that highly hindered diamines form an integral part of their structure. As a result, delayed cure of the bismaleimides to form the corresponding polybismaleimides is possible. That is, the bismaleimides of this invention have melting points which are sufficiently lower than the temperatures at which polymerization begins that the bismaleimides can be maintained in a fluid state at or above their melting points for a time sufficient to enable formation of a completely homogeneous melt prior to the commencement of polymerization and final curing. In essence, the bismaleimides can be maintained in the fluid state for an indefinite period of time as long as temperatures equal to or greater than the polymerization initiation temperature are avoided. For example, time sufficient for performance of a complete temperature profile on the melt can be readily attained.

Without intending to limit the scope of this invention in any way whatsoever, it is believed that the melting points of the compounds of this invention are lower than those of conventional bismaleimides because of the highly three dimensional spatial arrangement of the molecules. This reduces close packing in the solid state. Conventional commercial bismaleimides are essentially coplanar and, thus, higher melting. The three dimensional structure is also believed to cause the delayed curing properties because of kinetic effects.

Except for the delayed cure feature which was heretofore impossible for polybismaleimides, the polymerization of the bismaleimides of this invention is fully conventional. Typical polymerization temperatures are 190°–260° C., typically 200°–245° C. and most preferably about 245° C. Typical polymerization times are in the 1–4 hour range. As usual, polymerization of the bismaleimides is effected in a totally self-activated manner simply by heating. As is further usual, specific polymerization conditions can be optimized using fully conventional considerations and routine parametric experiments where necessary.

The polybismaleimides of this invention are useful for all of the same purposes which polybismaleimides and other polyamides have been used. Typically, the polymers are employed as binders in composite molded components. For example, they are used to prepare large compression molded articles on the order of several inches or more thick, e.g., glass filled syntactic foam or carbon filled syntactic foam compression moldings. They have also been employed as binders for circuit board manufacture. Composites based upon the polymers can be filled with any conventional filler appropriate for the end use, such as the mentioned glass fibers, etc. The polybismaleimides of this invention find use in any environment in which it is necessary or expedient to have a reinforced plastic structural element which is highly resistant to temperature and has appropriately high values of compression strength per unit density. Composite components based upon the polybismaleimides of this invention can be fabricated using conventional molding procedures.

Without further elaboration, it is believed that one skilled in the art can, using the preceding description utilize the present invention to its fullest extent. The following preferred specific embodiments are, therefore, to be construed as merely illustrative, and not limitative of the remainder of the disclosures in any way whatsoever. In the following examples, all temperatures are set forth uncorrected in degrees Celsius; unless otherwise indicated, all parts and percentages are by weight.

EXAMPLE 1

41.5 g of maleic anhydride and 54.6 g of 1,2-bis(2-aminophenylthio)ethane (Cyanacure, obtained commercially from American Cyanamid Corporation) were reacted in dimethylformamide (400 ml) by heating to 55° C. for two hours. The intermediate maleamic acid was formed during the reaction. The reaction mixture was cooled to 40° C. Thereafter, 3.6 g of anhydrous sodium acetate and 90 ml of acetic anhydride were added to the mixture. The latter was reheated to 58° C. and held at this temperature for two hours during which time the desired 1,2-bis(2-maleimidophenylthio)ethane was formed. The product bismaleimide was separated from the reaction mixture by precipitation in a 2% aqueous salt solution. It was purified by filtration and washing in distilled water. The dried product had a melting point of 110°–115° C. and was a light yellow powder at room temperature. It is alternatively named: ethylene bis(2-maleimidophenylthio)ether.

EXAMPLE 2

The bismaleimide prepared in Example 1 was melted at a temperature of 150° C. It was permitted to remain at this temperature for 6 hours. The bismaleimide began to cure through olefin addition at 200° C.; however, a curing temperature of about 245° C. is preferred. The polymer is dark brown when cured along and is relatively hard. The fact that the bismaleimide did not begin to polymerize at the temperature at which it was fluid (delayed cure) was verified by differential scanning calorimetry.

Large compression molded articles on the order of several inches or more thick are prepared using the foregoing heating regimen. Because of the temperature homogeneity of the melt due to the extended high temperature treatment of the melt prior to initiation of curing, cracks, voids, and other defects are absent in the molded article when final mold pressures are applied.

EXAMPLE 3

Analogously to the procedures used in example 1, maleic anhydride is reacted with the respective hindered diamines to prepare the following compounds:
di(2-maleimidophenylthio)methane,
1,2-bis(2-maleimido-4-chloro-phenylthio)ethane,
1,2-bis(2-maleimido-4-bromo-5-ethyl-phenylthio)propane,
1,2-bis(2-maleimido-4-methoxy-5-methyl-phenylthio)ethane,
1,2-bis(2-maleimido-4,5-dibromo-phenylseleno)propane,
1,2-bis(2-maleimido-5-ethoxyphenoxy)ethane,
2-methyl-1,3-bis(2-maleimido-4-propyl-5-bromophenylseleno)propane,
1,2-bis(2-maleimidonaphthylthio)ethane, etc.

EXAMPLE 4

40 wt. parts of 1,2-bis(2-maleimidophenylthio)ethane prepared in example 1, is mixed in a mold (6 in×6 in×0.5 in) with 60 wt. parts of commercially available carbon microspheres. The mold is heated to a temperature of 150° C. for 30 minutes. The mold is closed and heated to 250° C. for 1.5 hours. The resultant molded composite has a compressive strength of 900–1000 psi.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for delayed curing of a bismaleimide, comprising: heating the bismaleimide to a temperature equal to or greater than its melting point but lower than the temperature at which it begins to polymerize; holding the melted bismaleimide at a temperature lower than that at which it begins to polymerize for a period of time sufficient to obtain a homogeneous melt; and then heating the bismaleimide to the temperature at which it polymerizes; said bismaleimide having the formula

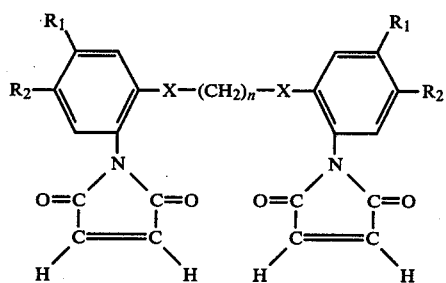

wherein $R_1$ and $R_2$ each independently is H, $C_{1-4}$-alkyl, $C_{1-4}$-alkoxy, Cl or Br, or $R_1$ and $R_2$ together form a fused 6-membered hydrocarbon aromatic ring, with the proviso that $R_1$ and $R_2$ are not t-butyl or t-butoxy;

X is O, S or Se;

n is 1–3; and the $-(CH_2)_n-$ group, optionally, is substituted by 1–3 methyl groups or by fluorine.

2. The method of claim 1 wherein the bismaleimide is 1,2-bis(2-maleimidophenylthio)ethane.

3. A polybismaleimide prepared according to the process of claim 1.

4. An oxygen and heat resistant composite in which the matrix is the polybismaleimide of claim 3.

* * * * *